United States Patent
Bremicker et al.

(10) Patent No.: US 7,843,714 B2
(45) Date of Patent: Nov. 30, 2010

(54) INVERTER, MORE SPECIFICALLY FOR PHOTOVOLTAIC PLANTS

(75) Inventors: Sven Bremicker, Alheim (DE); Frank Greizer, Kaufungen (DE); Matthias Victor, Niestetal (DE)

(73) Assignee: SMA Solar Technology AG, Niestotal (DE)

( * ) Notice: Subject to any disclaimer, the term of this patent is extended or adjusted under 35 U.S.C. 154(b) by 283 days.

(21) Appl. No.: 12/221,125

(22) Filed: Jul. 31, 2008

(65) Prior Publication Data

US 2009/0103340 A1 Apr. 23, 2009

(30) Foreign Application Priority Data

Oct. 19, 2007 (EP) ................................. 07020466

(51) Int. Cl.
*H02M 7/5387* (2007.01)
(52) U.S. Cl. ..................................... 363/132
(58) Field of Classification Search ............... 363/16, 363/17, 56.01, 56.02, 97, 98, 131, 132
See application file for complete search history.

(56) References Cited

U.S. PATENT DOCUMENTS

| | | | | |
|---|---|---|---|---|
| 4,638,138 | A * | 1/1987 | Rosa et al. ................ | 219/668 |
| 6,330,170 | B1 * | 12/2001 | Wang et al. ................ | 363/37 |
| 6,924,992 | B2 * | 8/2005 | Gaudin et al. ............. | 363/37 |
| 7,295,448 | B2 * | 11/2007 | Zhu ........................... | 363/17 |
| 7,522,437 | B2 * | 4/2009 | Konishi et al. ............ | 363/132 |
| 2010/0135051 | A1 * | 6/2010 | Mallwitz .................... | 363/40 |

FOREIGN PATENT DOCUMENTS

| | | |
|---|---|---|
| DE | 19732218 | 3/1999 |
| DE | 10221592 | 12/2003 |
| DE | 102004030912 | 1/2006 |
| DE | 102004037446 | 6/2006 |
| DE | 102006010694 | 9/2007 |

* cited by examiner

*Primary Examiner*—Matthew V Nguyen
(74) *Attorney, Agent, or Firm*—Thomas R. Vigil

(57) ABSTRACT

On an inverter (1) for converting an electric direct voltage, in particular of a photovoltaic direct voltage source into an alternating voltage with a direct voltage input with two terminals (DC+, DC−) and one alternating voltage output with two terminals (AC1, AC2) and with one bridge circuit including semiconductor switching elements (S1-S6), said bridge circuit comprising one first bridge branch (Z1) including four switching elements (S1-S4) and one second bridge branch (Z2) including two additional switching elements (S5, S6) as well as a freewheeling circuit provided with additional diodes (D7, D8), the efficiency is further increased without high frequency interferences and capacitive leakage currents having the possibility to occur on the generator side. This is achieved in that a respective one of the freewheeling diodes (D7, D8) forms a freewheeling branch together with a respective one of the switching elements (S2, S3) located in the first bridge branch (Z1), said freewheeling branch carrying a freewheeling current in a condition decoupled from the direct voltage.

11 Claims, 4 Drawing Sheets

US 7,843,714 B2

INVERTER, MORE SPECIFICALLY FOR PHOTOVOLTAIC PLANTS

FIELD OF THE INVENTION

The invention relates to an inverter for converting an electric direct voltage, more specifically a photovoltaic direct voltage source into an alternating voltage with a direct voltage input with two terminals between which there is provided a bridge circuit arranged in parallel, grid chokes being provided at the alternating voltage outputs of said bridge circuit, and with an alternating voltage output with two terminals.

The invention is not only limited to photovoltaic plants but also finds application in batteries and other direct voltage generators.

High efficiency but also safety aspects such as protection against high voltages are important when current is generated by photovoltaic plants.

Since photovoltaic generators generate direct voltage, said direct voltage must be converted at mains frequency into a voltage of corresponding amplitude for feeding it into a public utility grid or into an island network. This calls for a suited inverter. The efficiency of voltage conversion should be as high as possible in order to allow for economic operation of the plant.

On the other side, problems can occur with respect to hazardous touch voltages. Inverters with galvanic separation by means of a transformer are known to avoid such type of safety problems. The use of a transformer however leads to additional losses and, as a result thereof, to less efficiency.

Further aspects are the costs, the durability and the weight of an inverter. Transformerless inverters meet these requirements in an almost ideal way.

The missing galvanic separation and, as a result thereof, the lack of additional transformer losses between the DC and the AC side result in a reduction in power loss of the inverter on the one side, but also in problems with respect to leakage currents at the photovoltaic generators on the other side, which can lead to high touch voltages on construction parts. For topological reasons, big potential jumps at mains frequency or big high-frequency potential jumps can occur at the direct current source. Both disadvantages lead to significant and for safety reasons possibly inadmissible AC leakage currents from the direct current generators to the environment through the unavoidable parasitic capacitances of these generators with respect to earth potential.

DESCRIPTION OF THE PRIOR ART

A transformerless solution to avoid capacitive leakage currents is known from DE 10 2004 037 446 A1. This document describes that, if one eliminates the transformer in solar standard feeders, the reference potential of a non grounded solar generator with respect to earth changes dynamically with the chopper pulses of the inverter. Capacitive leakage currents occur hereby at the solar generator, which can on the one side damage the solar cells and on the other side cause hazardous touch voltages to occur at the glass surface of solar panels. The inverter utilized therein is therefore composed of a direct voltage converter that converts the direct voltage into a +/– voltage which is symmetrical with respect to earth potential and of a chopper that generates alternating voltage pulses. IGBTs and MOSFETs can be utilized as the power transistors.

Another circuit arrangement of a transformerless inverter for photovoltaic plants is shown and described in DE 102 21 592 A1. The circuit includes a bridge circuit with two connecting paths in each of which there is provided a switch as well as a series-connected diode. As a result, free-wheeling paths occur along which a choke current can propagate. This is to improve efficiency and to reduce current ripple. Thanks to the additional paths, an ohmic decoupling occurs between the solar generator and the alternating voltage terminals for the duration of freewheeling so that high frequency potential jumps at the solar generator are avoided. The switches of the bridge are preferably configured to be MOSFETs or IGBTs.

Another transformerless inverter for photovoltaic direct voltage sources is discussed in closer detail in DE 10 2004 030 912 B3. A decoupling switching element connected upstream of the bridge makes asymmetrical operation without high frequency interferences possible. Switches are hereby operated at mains frequency or at high frequency. In the decoupled condition, a freewheeling current occurs; this is made possible by an appropriate freewheeling circuit. This allows for high efficiency and for reduced current ripple. It is proposed to only configure the switching elements clocked at high frequency to be MOSFETs. As a matter of principle, these component parts comprise an anti-parallel diode that is referred to as what is termed a body diode; but these diodes switch on and off slowly and have a high stopper load. For this reason, it makes sense to use for the upper switches of the bridge IGBTs for example, which are connected together with additional anti-parallel discrete diodes but suffer from the disadvantage of higher losses when compared to the MOSFETs.

BRIEF SUMMARY OF THE INVENTION

It is the object of the invention to provide for a high efficiency transformerless inverter while preventing high frequency interferences and capacitive leakage currents from occurring on the generator side.

As a solution to this problem, there is proposed a circuit in accordance with the invention wherein there is provided a first bridge branch with four series connected switching elements and a second bridge branch with two series connected switching elements and wherein, between the alternating voltage terminal corresponding to the switches provided in the second bridge branch and a respective one of the connecting points between the two upper and the two lower switches of the first bridge branch there is connected one diode in the direction opposite the forward direction so that a respective one of the central switches of the first bridge branch and a respective one of the diodes carries a freewheeling current in a condition decoupled from the direct voltage.

Further advantageous features and implementations of the invention are characterized in the dependent claims.

The inverter of the invention has a very high efficiency (in the test>=98.5%) so that it is best suited for photovoltaic plants. Since the first bridge branch is provided with four series-connected switching elements and since the two central switches form a freewheel with a respective one of the additional diodes connecting the two bridge branches, a very advantageous ohmic isolation can be achieved during freewheeling so that the solar generator is operated isolated from the grid in certain phases of inner electric energy transport. The two outer switches are used to separate the direct current circuit or are configured to be decoupling switches. In the decoupled condition, the freewheeling circuit comprising additional diodes is operative, which carries a freewheeling current in a condition decoupled from the direct voltage. High frequency interferences as well as capacitive leakage currents at the solar generator can thus be avoided or at least considerably reduced. The circuit arrangement of the invention makes it possible to utilize for all the switches of the arrangement those actually having the least loss irrespective of whether there are provided anti-parallel diodes or not for component reasons. All the switches can comprise anti-parallel diodes. They are not necessary for the function of the circuit though and may also be absent.

As a result, best operation can be achieved for every single switch by dimensioning it appropriately. This is not the case in the solutions described in prior art.

This circuit configuration is particularly characterized by the fact that the freewheeling circuit comprises two components configured to be additional, for example discrete diodes that are connected in series so that this series-connection is connected in parallel to the switching elements of the first bridge branch that are clocked at mains frequency, a nodal point located between the two diodes being connected to the alternating voltage output of the second bridge branch. Through this provision, very fast diodes with a high rate of current rise di/dt and low recovery charge Qrr can be utilized for freewheel. Accordingly, this not only affords component savings with respect to diodes and, as a result thereof, a reduction in the circuit costs, but also further improves efficiency. This is very advantageous if the bridge is operated in the asynchronous mode of operation or if part of the bridge switches is clocked at mains frequency and another part at high frequency.

Moreover, the invention makes it possible to more readily trigger the switches and also to further reduce the manufacturing costs of the inverter circuit. This all the more so if, in accordance with another preferred implementation of the invention, all the switching elements are of the same construction type. Another advantage is the integration of the circuit arrangement in a semiconductor module.

By avoiding the parasitic leakage currents at the solar generator in accordance with the invention, one increases safety for plant and persons. It is thus easy to prevent the solar cells of the photovoltaic modules from being damaged or even hazardous touch voltages from occurring at the glass surface of the solar panels. As a result, a preferred implementation in the form of a transformerless inverter is possible. Such an inverter has a low weight, is compact and can be manufactured at low cost.

The circuit of the invention can be implemented not only for one-phase grids but can also accordingly be configured to be multiple phase, in particular two or three phase.

Appropriately, losses are reduced using a method for converting an electric direct voltage into an alternating voltage wherein the two central switching elements of the first bridge branch are switched at a mains frequency, in particular at 50 Hz or at 60 Hz, whilst the two outer switching elements as well as the two switching elements of the second bridge branch are clocked at high frequency, in particular in the kHz range, for example at 16 kHz. Through asymmetric clocking of the bridge, one achieves a smaller current ripple and higher efficiency.

A great effect of benefit is obtained if a respective one of the outer switching elements located in the first bridge branch is clocked in synchronism with a respective one of the other two switching elements of the second bridge branch at high frequency. This not only makes it easier to trigger the switches but also leads to the best possible decoupling of direct voltage and alternating voltage side as well as to a reduction of the component load.

In order to minimize harmonics at the alternating voltage at the inverter's output and, as a result thereof also losses at the chokes, it is particularly advantageous if part of the switching element, in particular the switching elements that are clocked at high frequency, are triggered with pulse-width modulation.

The invention will be described in closer detail herein after with reference to the drawings.

DETAILED DESCRIPTION OF THE INVENTION

Figure 1:
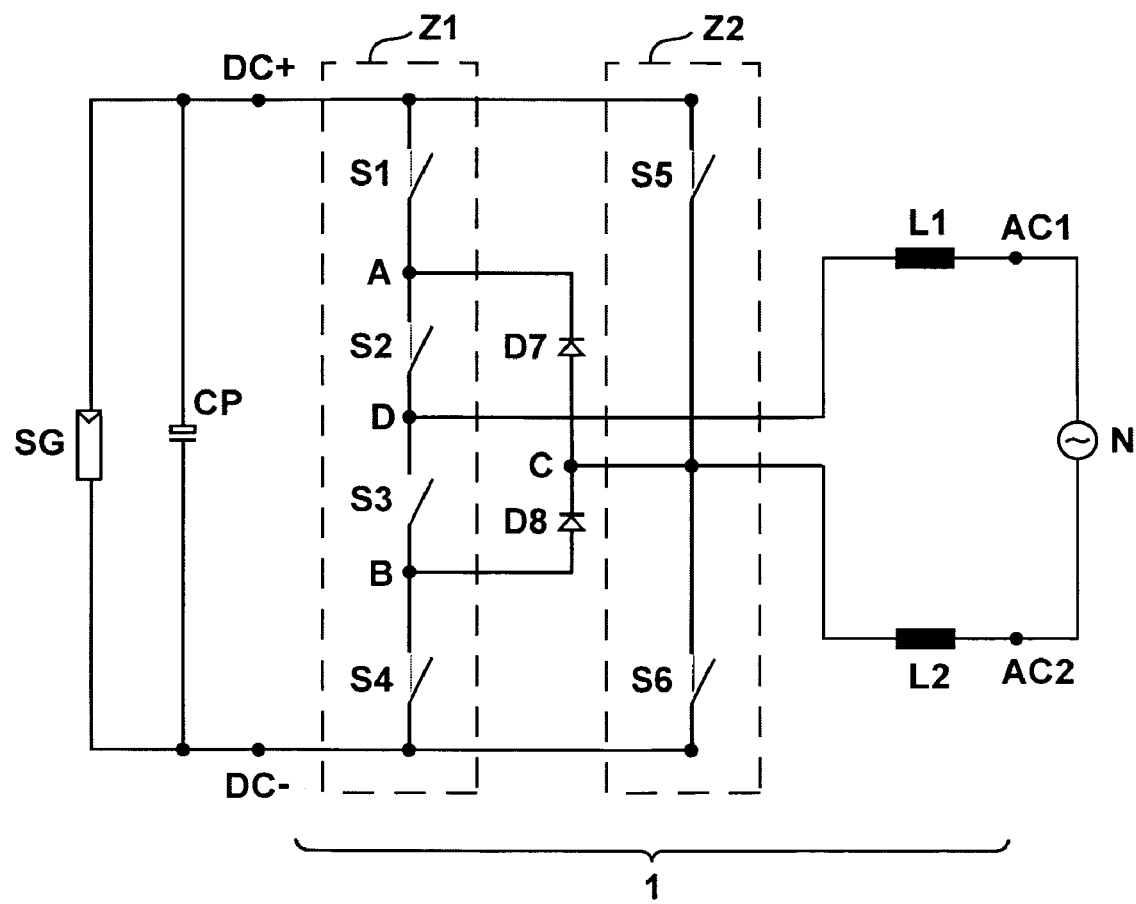
FIG. 1 shows an illustration of a circuit arrangement of an inverter for a photovoltaic plant in accordance with the invention.

FIG. 1 shows a transformerless inverter 1 with considerably improved efficiency over prior art and with least operational leakage currents at the solar generator. In the FIGS. 1 through 7, switching symbols of mechanical switches were used in order to better illustrate the functioning principle of the circuit to be described.

The inverter 1 serves to convert an electrical direct voltage delivered by a photovoltaic generator SG into an alternating voltage for a current grid N. The inverter 1 has a direct voltage input with the terminals DC+ and DC− and an alternating voltage output with the terminals AC1 and AC2.

Downstream of the generator SG having a buffer capacitor CP as an intermediate circuit there is connected an arrangement consisting of six semiconductor switching elements S1 through S6 and two diodes D7 and D8. The switching elements S1 through S6 are arranged for two bridge branches Z1, Z2 to form, which are connected in parallel with the generator SG or with the buffer capacitor CP. The first bridge branch Z1 includes a series connection of the switching elements S1, S2, S3 and S4. The second bridge branch Z2 includes a series connection of the switching elements S5 and S6.

The diodes D7 and D8 are connected in series and are interposed between nodal points A and C or C and B. The nodal point A lies between the two upper switching elements S1, S2 of the first branch Z1 and connects these series-connected elements. The nodal point B lies between the two lower series-connected switching elements S3, S4 in the first branch Z1 which it connects. The nodal point C lies between the diodes D7, D8 and is a linkage point of the series-connected switch elements S5, S6 in the second branch Z2, this point leading to the alternating voltage output AC2 via a choke L2, as can be seen from FIG. 1. The upper or first diode D7 is thereby connected for its cathode to be connected to the first nodal point A and its anode to be connected to the third nodal point C. The lower or second diode D8 is connected for its cathode to be connected to the third nodal point C and its anode to the second nodal point B. A fourth nodal point D is interposed between the two central switching elements S2, S3 of the first branch Z1 and is connected to the alternating voltage output AC1 via the choke L1.

Accordingly, the alternating current lines are connected to the nodal points C and D, the alternating current being fed into the current grid or into a utility grid via the alternating voltage terminals AC1 and AC2 through two grid chokes L1, L2.

The freewheeling circuit includes a respective one of the two diodes D7, D8 which are configured to be additional component parts and are connected in series so that this series connection is connected in parallel with the switching elements S2, S3 of the first bridge branch Z1 as well as a respective one of the switching elements S2, S3. Every single diode D7, D8 and each of the switching elements S2, S3 are associated with a half wave. The nodal point C interposed between the two diodes D7, D8 is connected to the alternating voltage output AC2 through the grid choke L2. The nodal point D located between the switching elements S2, S3 is connected to the alternating voltage output AC1 through the grid choke L1.

The two central switching elements S2, S3 of the first bridge branch Z1 are connected at mains frequency, in particular at 50 kHz or at 60 kHz. The other two switching elements S1, S4 of the first bridge branch Z1 are clocked at high frequency, in particular in the kHz range, and in particular e.g. at 16 kHz. Moreover, the switching elements S5, S6 located in the second bridge branch Z2 are clocked at high frequency in synchronism with the two other switching elements S1, S4 of the first bridge branch Z1, meaning also at 16 kHz for example, so that the switching elements S1, S4, S5 and S6 are clocked at 16 kHz for example. Pulse-width modulation is additionally provided.

Figure 2:
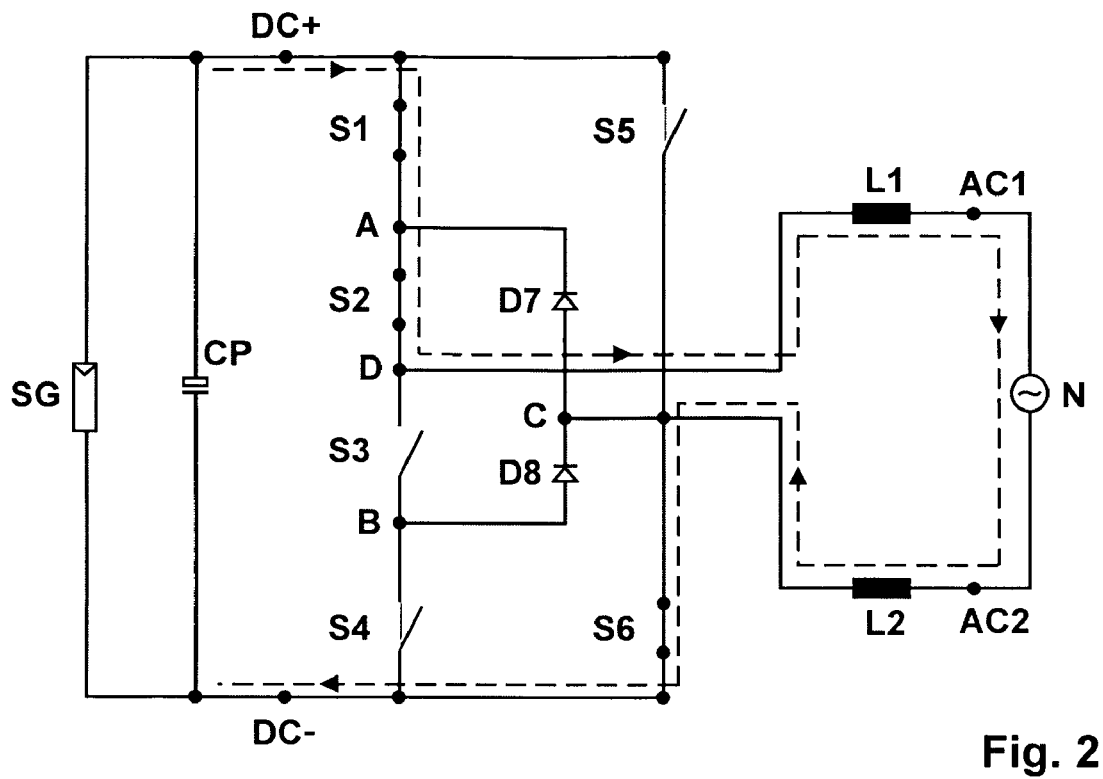
FIG. 2 shows an illustration of the circuit arrangement shown in FIG. 1, with a current path for a positive half wave of a grid current, two upper switches of a first bridge branch and one lower switch of a second bridge branch being closed.
Figure 3:
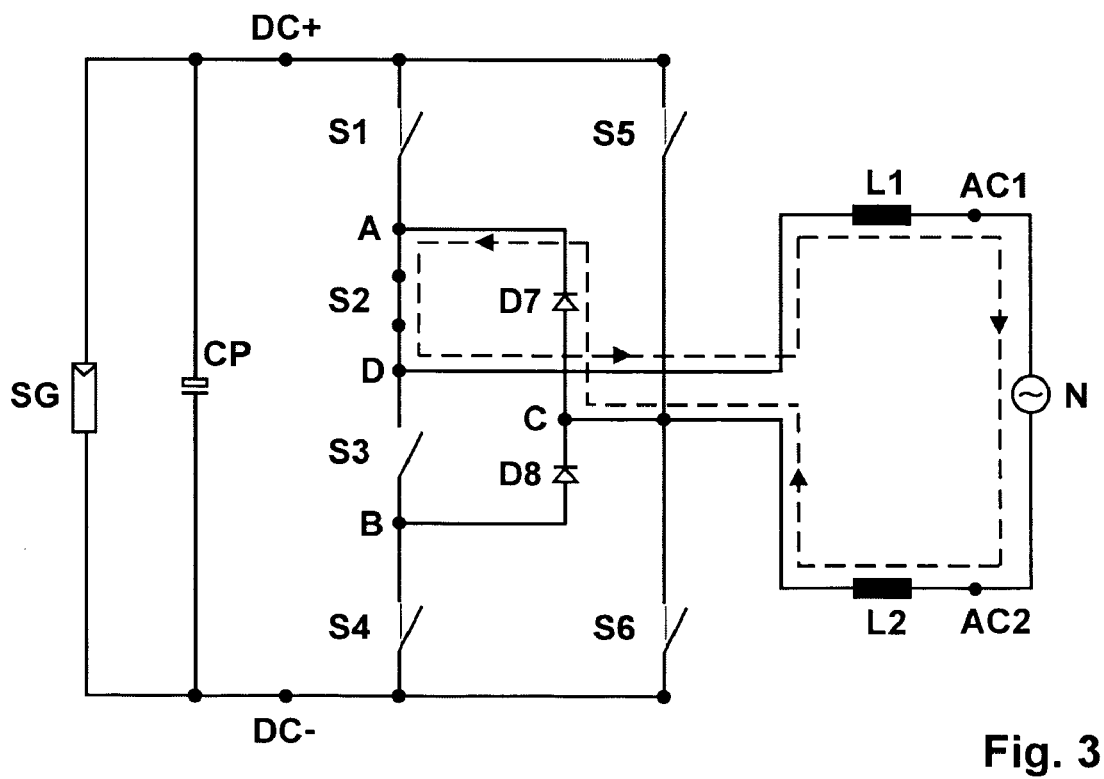
FIG. 3 shows an illustration of the circuit arrangement shown in FIG. 1, with a freewheeling current path for the positive half wave of the grid current, only the upper central switch of the first bridge branch in the freewheeling circuit being closed.

As shown in FIG. 2 and in FIG. 3, the switching element S2 is closed during the positive half wave of the grid voltage. For the duration of this half wave, the switching elements S1 and S6 are clocked in synchronism and at high frequency. If the switching elements S1 and S6 are closed, a load current flows. This current flow is shown in a dashed line in FIG. 2.

FIG. 3 shows that the load current flows into the freewheeling circuit including the switching element S2 and the upper diode D7 after the switching elements S1 and S6 have opened. This current flow is also shown in a dashed line in FIG. 3, this current flow being still associated with the positive half wave.

Figure 4:
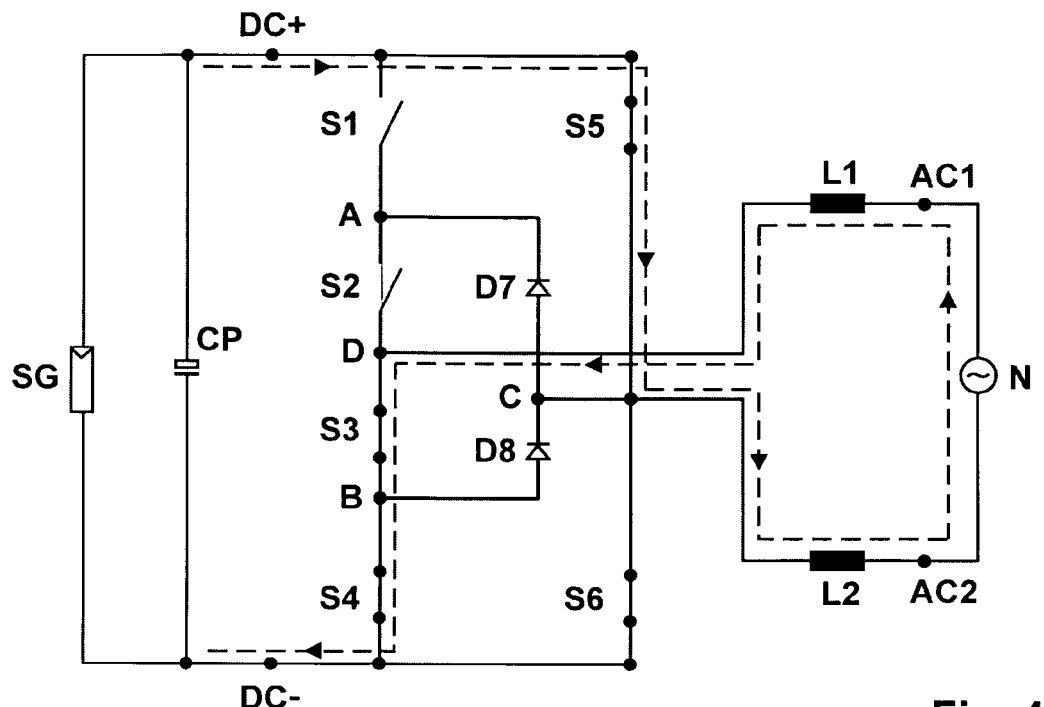
FIG. 4 shows an illustration of the circuit arrangement shown in FIG. 1, with a current path for a negative half wave of a grid current, two lower switches of the first bridge branch and one upper switch of the second bridge branch being closed.
Figure 5:
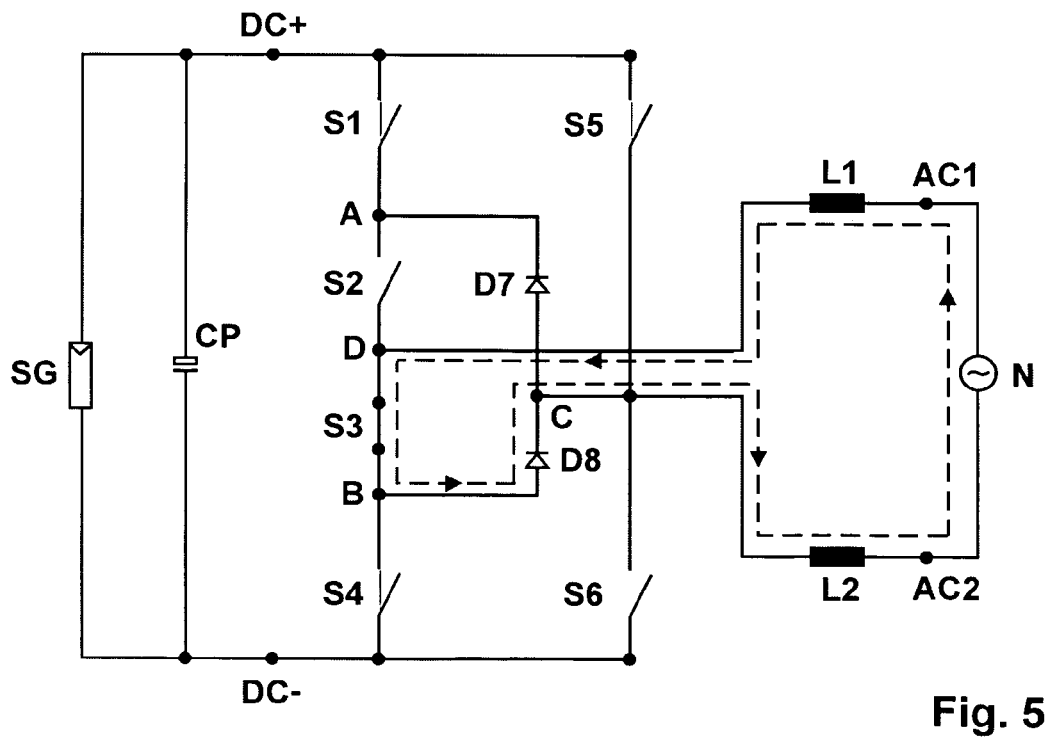
FIG. 5 shows an illustration of the circuit arrangement shown in FIG. 1, with a freewheeling current path for the negative half wave of the grid current, only the lower central switch of the first bridge branch in the freewheeling circuit being closed.

During the negative half wave of the grid voltage, the switching element S3 is closed, as shown in the FIGS. 4 and 5, the switching elements S4, S5 being clocked in synchronism and at high frequency. For, if the switching elements S4, S5 are closed, the load current flows through the switching elements S5, S3 and S4 as shown in a dashed line in FIG. 4.

After the switching elements S5 and S4 have opened, the switching element S3 and the diode D8 form a freewheeling circuit for the load current, as this appears from FIG. 5.

Appropriately, very fast components, meaning components with a high rate of current rise di/dt and low recovery charge Qrr are used for the diodes D7, D8. As a result, the losses are low during commutation.

Figure 6:
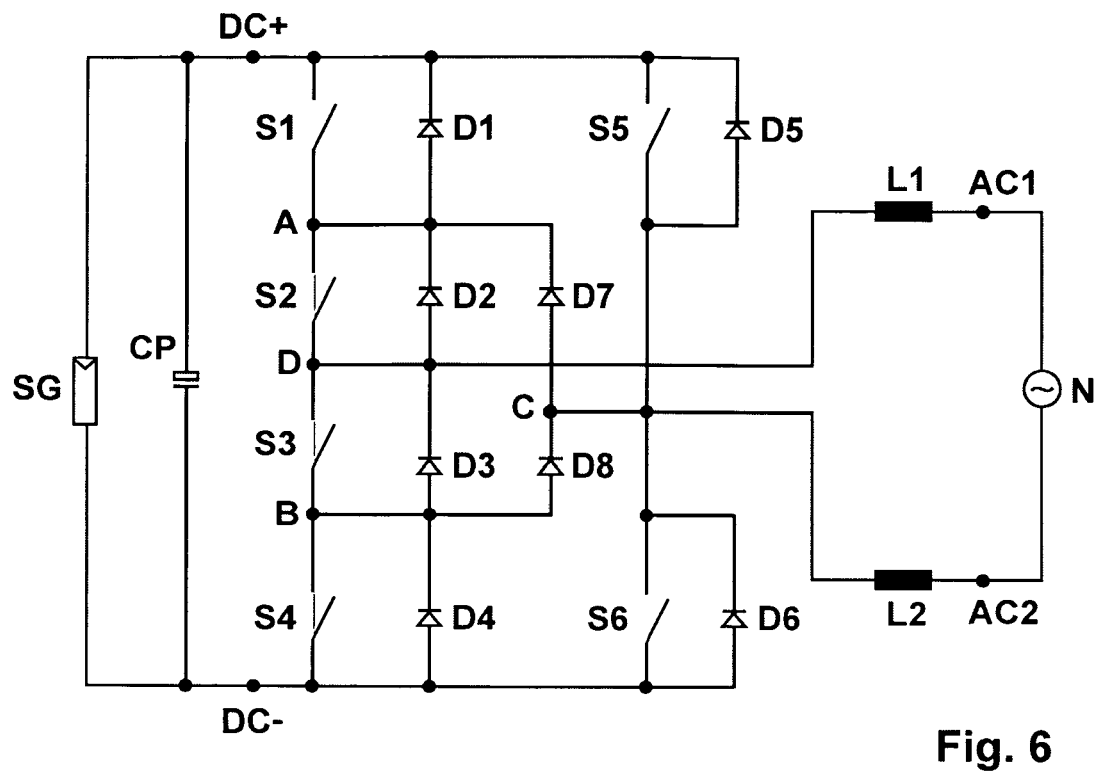
FIG. 6 shows an illustration of the circuit arrangement with anti-parallel diodes for each switch and FIG. 7 shows an illustration of a prior art circuit arrangement.

Any known semiconductor switch such as MOSFETs, FETs or IGBTs can be used in principle. Particularly high efficiency however is achieved if MOSFETs are utilized for all the switching elements S1 through S6. For component part reasons, these MOSFETs have internal anti-parallel diodes D1 through D6 so that the circuit actually includes additional diodes D1 through D6 as shown in FIG. 6.

Through this circuit arrangement, it is possible to consequently only utilize one construction type of the most modern semiconductor technology for all the semiconductor switching elements S1 through S6. This facilitates integration of the circuit arrangement in a semiconductor module, the manufacturing thereof and the expense for triggering.

Figure 7:
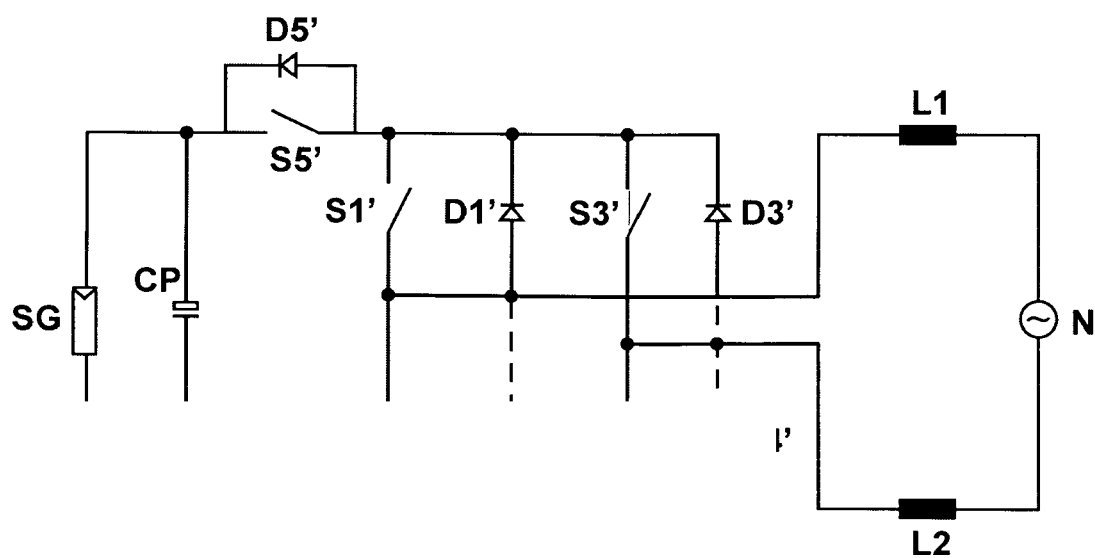

Since for technological reasons MOSFETs with a low switch-on resistance have a bad anti-parallel diode or body diode, the advantages of the MOSFETs, namely a very good switching and forward behaviour, could not be made use of hereto before, this being explained in closer detail with reference to FIG. 7.

The switches S2', S4' and S5' are for example clocked at 16 kHz. Depending on the grid polarity current flows through the anti-parallel diodes D1' or D3' in the freewheeling phases. If the switches S1' and S3', which are switched at 50 kHz, were here configured to be MOSFETs, the poorer anti-parallel diodes used for technological reasons would lead to considerable switching losses. As a result, the switches S1' and S3' are used as IGBTs with an additional anti-parallel diode. As compared to MOSFETs, the IGBTs in this application have a poorer switching behaviour and, in particular in part load operation, also poorer forward behaviour. Therefore, in practical operation, MOSFETs are only used for the switches S2' and S4', the body diodes D2', D4' of which are shown in a dashed line in FIG. 7. The diodes D2' and D4' are of little importance for the functioning of the circuit.

This drawback can be avoided thanks to the invention so that all the switches can be configured to be MOSFETs. During freewheel through the switching elements S2 or S3 as shown in the FIGS. 3 and 5, the switching elements S1 and S6 or S4 and S5, which are clocked at high frequency, are opened so that the direct voltage circuit is decoupled from the load circuit. This leads to low operational leakage currents.

The switching elements S2 or S3 can thereby even be configured to be a parallel connection of MOSFET and IGBT for example in order to combine the advantages of the two component types in the light load and nominal load range without having to cope with disadvantages.

LIST OF NUMERALS 1 inverter
SG generator
CP buffer capacitor
L1, L2 chokes
A, B, C, D nodal points
DC+, DC− terminals of the direct voltage input
AC1, AC2 terminals of the alternating voltage output
S1-S6 switching elements
D1-D8 diodes
N grid
Z1, Z2 bridge branches

We claim:
1. An inverter for converting an electric direct voltage, more specifically of a photovoltaic direct voltage source, into an alternating voltage with a direct voltage input with two terminals between which there is provided a bridge circuit arranged in parallel, grid chokes being provided at the alternating voltage outputs of said bridge circuit, and with an alternating voltage output with two terminals, characterized in that there is provided a first bridge branch with at least four series connected first through fourth switching elements and a second bridge branch with at least one fifth and one sixth switching element and that, between the alternating voltage terminal, which takes departure from said second bridge branch, and the connecting point corresponding to the fifth and sixth switching element provided in the second bridge branch and the respective connecting points between the first and the second or the third and the fourth switching element of the first bridge branch there is respectively connected one diode in the direction opposite the forward direction so that a respective one of the central second or third switches of the first bridge branch and a respective one of the diodes carries a freewheeling current in a condition decoupled from the direct voltage.

2. The inverter as set forth in claim 1,
characterized in that all the first through sixth switching elements and diodes are integrated in a semiconductor module.

3. The inverter as set forth in claim 1,
characterized by an implementation as a transformerless inverter.

4. The inverter as set forth in claim 1,
characterized by a multiple phase implementation.

5. A method of converting an electric direct voltage into an alternating voltage with an inverter as set forth in claim 1, characterized in
that both triggering signals at mains frequency and such with a high clock frequency are available for the first through sixth switching elements of the bridge circuit,
the second switching element being clocked at mains frequency and the first and sixth switching element being clocked at a high clock rate during a half wave of the grid voltage, the third switching element being clocked at mains frequency and the fourth and fifth switching elements at a high clock rate during the other half wave of the grid voltage and
the first, fourth, fifth and sixth switching elements being triggered so asymmetrically that the first or the fourth switching element of the first bridge branch is respectively triggered, whilst the fifth or the sixth switching element of the second bridge branch is clocked at the same clock rate and
that, during at least one freewheeling phase, a freewheeling current flows through the second switching element and the diode at the one half wave of the grid voltage or that a freewheeling current flows through the third switching element and the diode at the other half wave of the grid voltage so that the alternating voltage circuit decouples from the direct voltage circuit during freewheeling.

6. The method of converting an electric direct voltage into an alternating voltage with an inverter as set forth in claim 5,
characterized in that the second and third switching elements of the first bridge branch are connected at mains frequency, in particular at 50 Hz or 60 Hz, whilst the two other first and fourth switching elements of the first bridge branch as well as the fifth and sixth switching element of the second bridge branch are clocked at high frequency, in particular in the kHz range.

7. The method of converting an electric direct voltage into an alternating voltage with an inverter as set forth in claim 5,
characterized in that the first switching element of the first bridge branch and the sixth switching element of the second bridge branch are clocked in synchronism during the one half wave of the grid voltage and that the switching element of the first bridge branch and the switching element of the second bridge branch are clocked in synchronism during the other half wave of the grid voltage.

8. The method as set forth in claim 7,
characterized in that the additional switching elements located in the first bridge branch are clocked at high frequency in synchronism with the two other fifth and sixth switching elements of the second bridge branch.

9. The method as set forth in claim 7,
characterized in that part of the switching elements, in particular the first, second, fourth and fifth switching elements, which are clocked at high frequency, are triggered with pulse-width modulation.

10. A method for converting an electric photovoltaic direct voltage into an alternating voltage with an inverter as set forth in claim 1.

11. A method for converting an electric photovoltaic direct voltage into an alternating voltage with a method as set forth in claim 5.

* * * * *